United States Patent [19]
Lockwood

[11] 3,760,283
[45] Sept. 18, 1973

[54] SAMPLING DEVICE
[75] Inventor: Larry R. Lockwood, McMinnville, Oreg.
[73] Assignee: Tektronix, Inc., Beaverton, Oreg.
[22] Filed: Aug. 23, 1971
[21] Appl. No.: 174,109

[52] U.S. Cl.............. 328/151, 328/65, 333/10, 333/20
[51] Int. Cl. ........................... H03k 5/00
[58] Field of Search ........ 333/10, 20; 328/151, 328/65

[56] References Cited
UNITED STATES PATENTS
2,972,121  2/1961  Firestone ....................... 333/10
3,213,363  10/1965  Shively ......................... 333/10 X
3,241,076  3/1966  Magieby et al. ................ 328/151

*Primary Examiner*—John Zazworsky
*Attorney*—Stephen W. Blore et al.

[57] ABSTRACT

A sampling device employing micro-strip components charges a pair of memory capacitors during predetermined sampling periods. Directional couplers, formed by input transmission lines and sampling pulse transmission lines, provide rectangular sampling pulses of predetermined duration. The sampling pulse is also substantially attenuated at the signal input.

13 Claims, 9 Drawing Figures

Patented Sept. 18, 1973
3,760,283
2 Sheets-Sheet 1
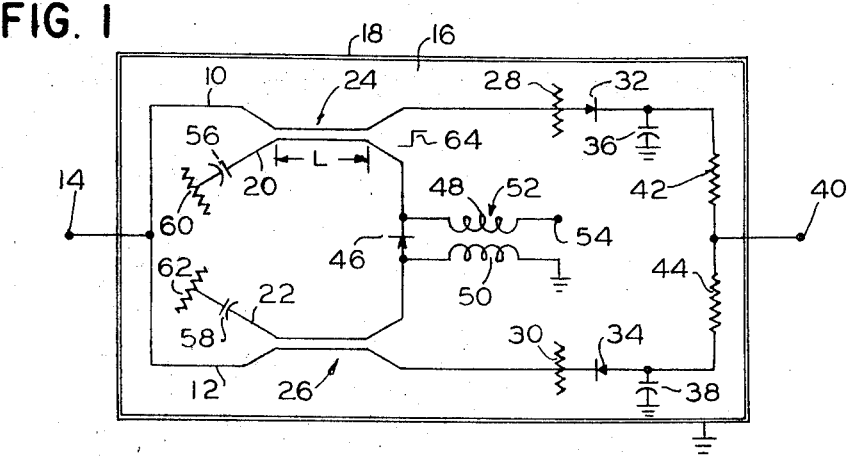
FIG. 1
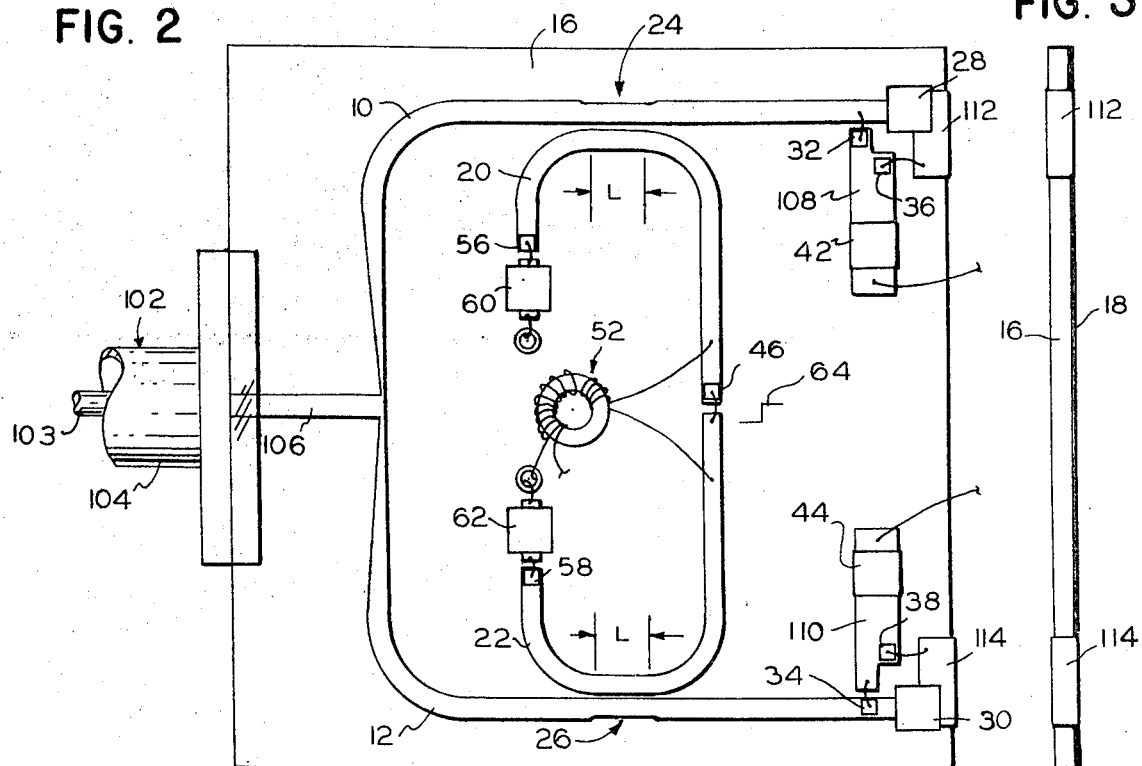
FIG. 2
FIG. 3
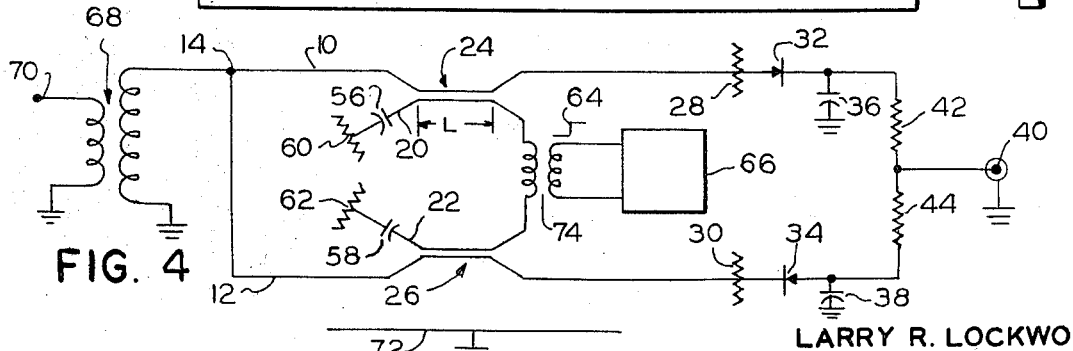
FIG. 4
LARRY R. LOCKWOOD
INVENTOR
BY
BUCKHORN, BLORE, KLARQUIST & SPARKMAN
ATTORNEYS

SAMPLING DEVICE

BACKGROUND OF THE INVENTION

The present invention relates to a sampling device and particularly to a sampling device for producing an adequate sample of an input signal while attenuating the sample pulse at the input signal terminal.

Conventional circuits for sampling portions of an RF signal have employed a bridge circuit or the like wherein certain diodes are caused to conduct by a differentiated sampling pulse. That is, the narrow sampling pulse is triangular or trapezoidal in nature which tends to limit the energy of the input signals which may be stored by the sampler. Furthermore, the conventional sampling system is subject to "kickout" wherein the sampling or strobe pulse is undesirably coupled back into the input signal channel.

SUMMARY OF THE INVENTION

According to the present invention, a transmission line sampling device is provided including a first transmission line coupled to an input terminal and a second transmission line in spaced relation thereto to provide a directional coupler. Temporary storage means, such as a capacitor and diode may be coupled to the first transmission line for storing samples of the input signals propagated thereon. The second transmission line and the first together comprise a directional coupler wherein a step wave applied to the second transmission line provides a rectangular sampling or strobe pulse appearing only at the output of the first transmission line and not at the input terminal. The length of this rectangular sampling or strobe pulse is determined by the transit time of the directional coupler. The combination of the strobe pulse or sampling pulse and the input signal on the first line produces a stored value on the temporary storage means.

According to a preferred embodiment of the invention, a balanced circuit is employed which includes a pair of directional couplers. The added balance further reduces the "kickout" of the strobe pulse, and the output does not depend directly on strobing level. The invention is preferably realized in micro-strip form.

Accordingly, it is an object of the present invention to provide a sampling device which greatly attenuates the strobe or sampling pulse which appears at an RF input signal terminal.

It is a further object of the present invention to provide an improved sampling device characterized by approximately rectangular strobing pulses for providing maximum transfer of charge.

It is a further object of the present invention to provide a balanced sampling device with an output that does not depend directly on strobing level.

It is a further object of the present invention to provide a sampling device that can be realized in micro-strip form.

Another object of the present invention is to provide a sampling device wherein the sampling pulse length is accurately predetermined.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a semi-schematic diagram of a sampling device according to the present invention;

FIG. 2 is a plan view of a micro-strip embodiment of a sampling device according to the present invention;

FIG. 3 is an edge view of the FIG. 2 device;

FIG. 4 is a schematic diagram of sampling device according to the present invention for illustrating operation thereof;

DETAILED DESCRIPTION

Figure 5:
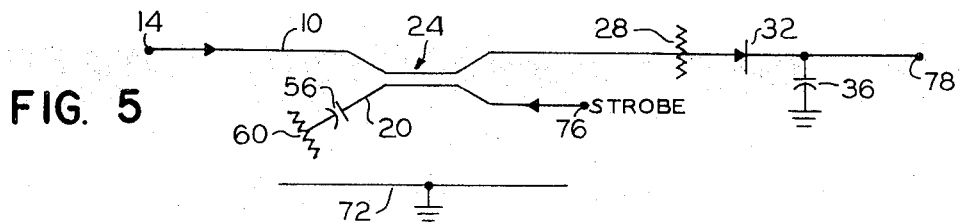
FIG. 5 is a schematic diagram of another sampling device according to the present invention.

Referring to the drawings and particularly to FIG. 1, a sampler according to the present invention is schematically illustrated and includes first transmission lines 10 and 12 connected in common to input terminal 14. Both first transmission lines are disposed on a common insulating substrate 16 superimposed over a ground plane 18. First transmission lines 10 and 12 are closely spaced from second transmission lines 20 and 22, along a distance L, forming directional couplers generally indicated at 24 and 26. The first transmission lines terminate in their respective characteristic impedances schematically indicated at 28 and 30. The termination point is also connected via oppositely poled diodes 32 and 34, respectively, to capacitors 36 and 38 having their opposite terminals grounded. The anode of diode 32 is connected to line 10 at termination 28, while the cathode of diode 34 is connected to line 12 at termination 30. The ungrounded plates of capacitors 36 and 38 may be coupled to common output terminal 40 via resistors 42 and 44.

The directional couplers 24 and 26 are termed "backwards couplers" and their operation will be hereinafter more fully described. The input ends of the second transmission lines 20 and 22 are connected across snap-off diode 46, the respective terminals of which are connected to a first winding 48 and a second winding 50 of a balancing transformer 52. Winding 48 is connected between the cathode of diode 46 and input terminal 54 while winding 50 is connected between the anode of diode 46 and ground. Lines 20 and 22 on the remote sides of directional couplers 24 and 26 from snap-off diode 46 are coupled via capacitors 56 and 58 to characteristic impedance line terminations 60 and 62.

The circuit operation will first be described with reference to the diagram of FIG. 4 which is essentially similar to FIG. 1 but includes an input transformer 68 for receiving input RF signals from terminal 70 and applying the same to the sampler input terminal 14. The ground plane is schematically illustrated at 72, and a step wave pulse generator 66 is employed for applying a step wave 64 to lines 20 and 22 via transformer 74.

It will be seen the step wave is actually applied with relatively opposite potential to transmission lines 20 and 22.

The circuit described is employed for sampling portions of the input received. Normally, the input at terminal 14 passes down transmission lines 10 and 12 and to diodes 32 and 34, respectively. With a small signal level passing down transmission lines 10 and 12, and as charge builds up on capacitors 36 and 38, diodes 32 and 34 will be non-conducting and hence the signal will be terminated in resistors 28 and 30 respectively. However, when it is desired to sample a portion of the input signal, a step wave 64 is applied from a step wave generator 66.

When the positive step 64 is applied at the input ends of lines 20 and 22, a pulse is coupled to lines 10 and 12 via directional couplers 24 and 26, but in the direction of terminations 28 and 30 and not in the direction of transformer 68. Pulse signals from directional couplers 24 and 26 toward diodes 32 and 34 "strobe" the diodes, charging capacitors 36 and 38 toward the level of the strobe pulse plus the RF input signals present at the diodes at that time. Consequently capacitors 36 and 38 will substantially store this level between strobes from step wave generator 66. The signal coupled via resistors 42 and 44 to output terminal 40 will approximately equal the applied input voltage at the time of the sample. Thus, the positive and negative versions of the strobe pulse appearing at capacitors 36 and 38 will be canceled at output terminal 40.

Figure 7:
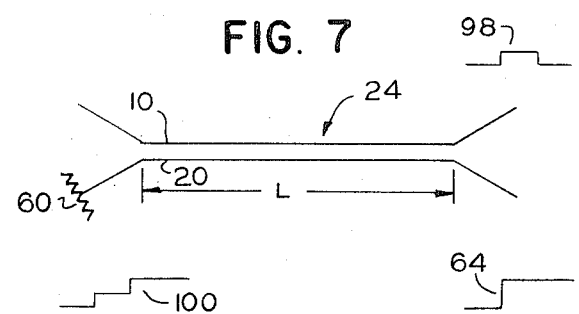
FIG. 7 is a schematic diagram of a directional coupler according to the present invention utilized for explaining operation.

Reference is made to FIG. 7 for a further understanding of the operation of the directional couplers. In the directional coupler 24 for instance, transmission lines 10 and 20 are relatively closely spaced for a distance, L, approximately equal to a quarter wave length at about 16 to 18 gigahertz. On either side of the coupler, the lines diverge from one another, i.e., are more widely spaced to reduce coupling substantially. It is understood that an RF signal is passing down transmission line 10 from the left to the right, in addition to the pulse waveforms as illustrated. At a given time, step wave 64 is applied at the right-hand end of line 20. In the directional coupler, both electrostatic and electromagnetic coupling are present between the two lines, having subtractive and additive effects at either end of the line 10 portion of the directional coupler. The capacitively coupled signal in line 10 resulting from step wave 64 is bidirectional, that is, it would tend to produce currents in both directions in line 10, while the electromagnetically coupled signal is unidirectional, i.e., resulting in a current to the right in FIG. 7 and from the left. As a result, the pulse signal cancels to the left of the coupler on line 10 in FIG. 7, but produces a pulse output 98 to the right on line 10. Pulse 98 will be of short duration, equaling twice the transit time of transmission line length, L. Waveform 100 illustrates the remainder of step wave 64 received at termination 60.

The directional couplers are here employed as the pulse generators for providing the sampling pulse 98 of a given duration with substantially sharp leading and trailing edge. I.E., the pulse is nearly rectangular. This pulse produces optimum sampling of the input signal by passing optimum charge from the input for substantially the duration of the sampling pulse, unlike prior art samplers wherein a sharp, peaked sampling pulse is employed. That is to say, a differentiated sampling pulse is not here employed. Moreover, since the directional coupler is highly directional, there is very low coupling of the strobe pulse toward the input terminal 14. Of course, the balanced circuit including both lines 10 and 12 will tend to cancel the strobe pulse at the input, but nevertheless prior circuits employing only a balanced circuit have still been susceptible to "kickout" of the strobe pulse.

In the present circuit, the coupling of the strobe pulse to the RF input terminal is reduced substantially due to both effects of the directional couplers and the balanced circuit. The present circuit also provides a good impedance match at the input terminal. Thus the input is terminated correctly at 28 and 60, for example, and the input signal does not see transformer 74 or the snap-off diode of FIG. 1 due to coupler directivity. The design can be realized in micro-strip form, and furthermore, the balanced output also provides an output that does not depend directly on strobing level.

It will be realized that the directional couplers will also couple RF energy flowing to the right, e.g., in line 10, back to toward the left in line 20. The capacitor 56 (in FIG. 4) couples this reflected RF energy into termination 60.

Returning to FIG. 1, in the actual embodiment the step wave 64 is produced by snap-off diode 46. The snapoff diode may normally be provided with a current, as well understood by those skilled in the art (by connection means not shown), and is turned off by a positive going pulse at terminal 54. The positive pulse removes the charge on the snap-off diode, and a fast transition to the off state takes place. The voltage across the snap-off diode does not follow the voltage at terminal 54 due to the storage of minority current carriers which have been injected through the diode junction during the normal condition. The voltage across the diode increases at a rapid rate to produce an output step which has a much faster rise time than the step applied at terminal 54. The balancing transformer 52 insures drive to the snap-off diode is well balanced so as to produce the desired equal amplitude pulses of opposite polarity for both transmission lines 20 and 22.

A micro-strip embodiment of the circuit according to the present invention is illustrated in FIGS. 2 and 3. An input coaxial connection 102 of the usual type having an outer conductor 104 and an inner conductor 103 is attached at the side of the micro-strip embodiment, with the inner conductor 103 connecting to a metallic deposited conductor 106, leading from inner conductor 102 to the first transmission lines 10 and 12. Transmission lines 10 and 12 are narrowed where they join conductor 106 for impedance matching purposes. All conductors, including the transmission line portions in FIG. 2, are conveniently formed as deposited gold strips on insulating substrate 16, except that hereinafter mentioned. The insulating substrate 16 is suitably formed of alumina approximately 0.025 inch thick.

The ground plane 18 is also formed of gold and suitably covers the entire back surface of substrate 16, as seen in FIG. 3. The outer conductor 104 of the input coaxial connector is joined to this ground plane 18. The diodes 32 and 34 are small semiconductor chips, with diode 32 being deposited upon conductor strip 108 and making connection with transmission line 10 by means of a small wire. Diode 34 is deposited near the right-hand end of transmission line 12 and makes connection with deposited conductor 110. Capacitors 36 and 38 are disposed upon conductors 108 and 110 and make connections with grounding tabs 112 and 114, respectively, which extend from ground plane 18. Terminations 28 and 30 comprise deposited resistors disposed serially between transmission lines 10 and 12 and the respective tabe 112 and 114. Similarly, terminations 60 and 62, as well as output resistors 42 and 44, comprise serially connected deposits of resistive material.

Snap-off diode 46 is disposed upon the right-hand end of transmission line strip 20 and connects to transmission line strip 22. Capacitors 56 and 58 are located upon transmission line strips 20 and 22 as shown, making connection with conductors connecting to resistors 60 and 62. The remaining terminals or resistors 60 and 62 are grounded through apertures in the substrate. A transformer 52 is suitably provided with a toroidal core and connected as indicated in FIG. 1.

The length, L, of the parallel transmission line portions forming the directional couplers are typically 0.080", or about a quarter wave length at 16 gigahertz. It is understood the coupler is here primarily used as a time domain devide for providing a sampling pulse. The directional couplers are known as TEM mode, coupled transmission line directional couplers in micro-strip form. For the couplers to be matched to the transmission line portions connected thereto having a characteristic impedance $Z_0$, it is necessary that $Z_0 = \sqrt{Z_{oe}Z_{oo}}$. The even mode impedance $Z_{oe}$ is the characteristic impedance of a single coupled line to ground when equal currents are flowing in the lines, while the odd mode impedance $Z_{oo}$ is the characteristic impedance of a single line to ground when equal and opposite currents are flowing in the lines. Also, $Z_{oe} = Z_0 \sqrt{1+c/1-c}$ and $Z_{oo} = Z_0 \sqrt{1-c/1+c}$. When a given coupling, $c$, is determined, the impedances $Z_{oe}$ and $Z_{oo}$ can be determined. Thus, the transmission lines 10 and 12 are necked down slightly in the region of the directional couplers for impedance matching purposes. The physical dimensions necessary to provide the values of $Z_{oe}$ and $Z_{oo}$ can be ascertained from design information given in "Microwave Filters, Impedance-Matching Networks, and Coupling Structures" by Matthaei, Young, and Jones, McGraw Hill Book Company, 1964. In a specific embodiment according to FIGS. 2 and 3, the spacing between lines in the coupler was 2 mils and the line widths were approximately 17 mils. A two transit time period in the case of a particular embodiment illustrated in FIGS. 2 and 3 was on the order of one-thirtysecond of a nanosecond, for producing a sampling pulse of that length, where L ≈ 0.080 inch.

Figure 6:
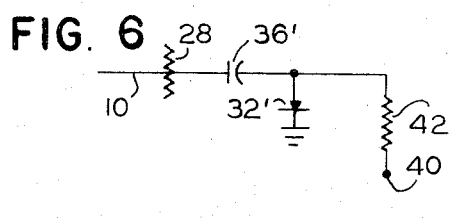
FIG. 6 is a schematic diagram of a circuit variation according to the present invention.

In the case of the embodiments of FIGS. 1 through 5, as hereinbefore indicated the diodes 32 and 34 function to couple charge to the capacitors 36 and 38 at the time of the sampling strobe pulse. However, an alternative placement of the capacitors and diodes can be employed. Referring to FIG. 6, the position of capacitor 36 and diode 32 have been reversed and these elements are now referred to by primed reference numerals. In this case, when a strobe pulse appears, the capacitor 36' charges through diode 32', and then, after the strobe pulse, the capacitor can only discharge slowly through resistor 42. The polarity of output is reversed from that of FIGS. 1 through 5. It is understood that for the circuit using the FIG. 6 configuration, a similar interchange of elements would take place with reference to diode 34 and capacitor 38. In such case, the anode and cathode connections of the diode 34 would be reversed from that illustrated for diode 32' in FIG. 6.

Figure 8:
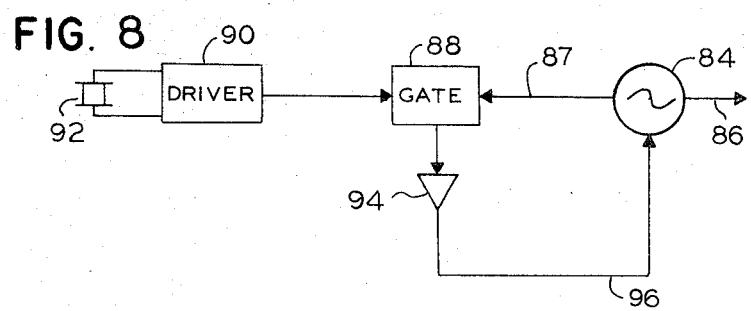
FIG. 8 is a block diagram of a phase lock circuit according to the present invention.
Figure 9:
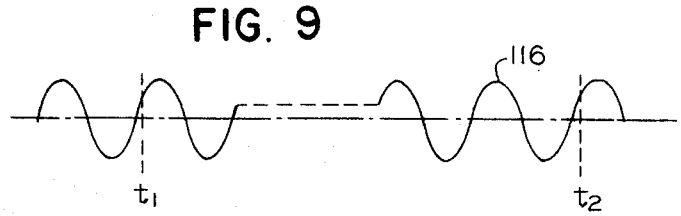
FIG. 9 is a waveform diagram illustrating operation of the FIG. 8 circuit.

FIG. 8 illustrates a phase lock circuit according to the present invention employing a sampling circuit, referred to by reference numeral 88. This sampling circuit or gate suitably comprises the balanced circuit as illustrated in FIGS. 2 and 3. In the FIG. 8 circuit, it is desired to phase lock oscillator 84 to a multiple of the frequency of driver 90, the latter being controlled by quartz crystal 92. Driver 90 comprises crystal controlled pulse generator. Oscillator 84, which is DC controlled, normally produces an output as indicated at 86 for a predetermined purpose, and the same output is also provided to gate 88 via lead 87. Each time driver 90 produces an output pulse, gate 88 samples the waveform output of oscillator 84 on lead 87. Referring to FIG. 9, such samples may occur at times $t_1$ and $t_2$ upon waveform 116, the latter illustrating the oscillator output. The dashed portion of this waveform in FIG. 9 is illustrative of a large number of cycles between samples indicated at $t_1$ and $t_2$. Sampler or gate 88 will provide a DC level indicative of the sampling level, governed by the phase of the waveform at which sampling takes place. If sampling takes place higher up on signal 116, gate 88 will provide a higher DC level to amplifier 94, tending to change the frequency of oscillator 84 via control lead 96 to restore the desired sampling level. Likewise, if sampling takes place at a lower level than desired, the DC output by way of amplifier 94 operates via lead 96 to restore the original condition. Oscillator 84 is controlled by the DC output of amplifier 94 in a conventional manner and this will be understood by those skilled in the art. The sampling circuit according to the present invention is particularly advantageous when employed as gate 88 in the FIG. 8 circuit inasmuch as substantially no strobe pulse is coupled into oscillator 84. In the case of many oscillator applications, the "kickout" of the strobe signal into the oscillator signal would be highly undesirable as when the uses for the oscillator signal require a spurious free waveform. Furthermore, the sampled signal is also substantial since rectangular sampling pulse is provided as hereinbefore explained.

While I have shown and described the preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

What is claimed is:

1. A sampling device comprising:
   an input terminal,
   means for coupling RF input signals to said input terminal, a first transmission line coupled to said input terminal and along which said RF signals propagate in a first direction away from said input terminal,
   a second transmission line including means for establishing electrostatic and electromagnetic coupling with said first transmission line for forming a backwards directional coupler therewith,
   and pulse applying means for providing a step wave to said second transmission line at a point thereon remote from the input-terminal-coupled end of the first transmission line for producing a pulse of predetermined length on said first transmission line propagating in the same direction as said RF signals for combining with said RF signals.

2. A sampling device comprising:
a first transmission line having an input terminal and temporary storage means coupled thereto,
a second transmission line including means for forming a directional coupler with the first transmission line,
and pulse generation means for providing a step wave to said second transmission line in a direction for appearing at said temporary storage means through the directional coupling properties of said directional coupler to cause a portion of input applied to said input terminal to be stored on said temporary storage means wherein the portion of the input stored is a function of the transit time of said directional coupler.

3. The device according to claim 2 further including an additional first transmission line, an additional second transmission line including means for forming a directional coupler with the additional first transmission line and also receiving a step wave from said pulse generation means,
additional storage means coupled to said additional first transmission line, and means for coupling said first transmission lines in parallel to said input terminal to complete a symmetrical arrangement.

4. The device according to claim 3 wherein said additional first and second transmission lines are substantially identical to the first mentioned first and second transmission lines.

5. The device according to claim 2 wherein said transmission lines comprise micro-strip transmission line conductors disposed on an insulating substrate backed by common ground plane.

6. The apparatus according to claim 2 wherein said pulse generation means includes a snap-off diode coupled to said second transmission line for providing a rapidly changing step wave function.

7. The apparatus according to claim 2 wherein said temporary storage means is disposed on the remote side of said directional coupler from said input terminal and comprises a capacitor, and a diode serially disposed between said capacitor and said first line, the remaining terminal of the capacitor being coupled to a reference point.

8. The device according to claim 2 wherein said temporary storage means is disposed on the remote side of said input terminal from said directional coupler and comprises a capacitor and a diode, said capacitor coupling said diode to said line, the remaining terminal of the diode being coupled to a reference point.

9. A sampling device comprising:
an input terminal, and a pair of first transmission lines coupled in parallel to said input terminal, wherein said first transmission lines are of substantially equal length and have substantially parallel portions to form a symmetrical arrangement,
a pair of second transmission lines disposed in parallel relation to parallel portions of said first transmission lines to form directional couplers therewith,
means for terminating said first transmission lines at symmetrical locations on the remote sides of said directional couplers from said input terminal,
capacitor means and unidirectional coupling means in circuit with said first transmission lines wherein said capacitors are adapted to provide temporarily stored sampled values,
means for providing symmetrical step wave drive to said second transmission lines for propagation therealong in a direction opposite to the prepagation of input signals coupled to said first transmission lines from the input terminal,
and termination means for terminating said second transmission lines on the remote side of said directional couplers from said means for providing step wave drive.

10. The apparatus according to claim 9 wherein said means for providing step wave drive comprises a snap off diode coupled between said second transmission lines, and a balancing transformer having first and second windings connected to either side of said snap-off diode and adapted to receive a step wave input for turning off said snap-off diode.

11. The apparatus according to claim 9 wherein said transmission lines are micro-strip lines comprising metal strips disposed upon an insulating substrate having a ground plane on the remote side thereof.

12. A sampling device comprising:
a first transmission line having an input terminal means,
a second transmission line disposed in coupled relation to the first to form a backwards directional coupler therewith,
means for applying a step signal to said second transmission line for establishing a pulsation in a given direction on said first transmission line,
and capacitor means coupled to said first transmission line for receiving said pulsation together with the magnitude of an input applied to said input terminal means.

13. The device according to claim 2 wherein said means for forming a directional coupler with the first transmission line comprises a portion of the second transmission line disposed in spaced relation with the first transmission line.

* * * * *

UNITED STATES PATENT OFFICE
CERTIFICATE OF CORRECTION

Patent No. 3,760,283      Dated September 18, 1973

Inventor(s) Larry R. Lockwood

It is certified that error appears in the above-identified patent and that said Letters Patent are hereby corrected as shown below:

Column 3, line 62, "edge" should be --edges--.

Column 4, line 57, "0.025" should be --.0025--.

Column 5, line 21, "devide" should be --device--.

Column 5, line 34, "$Z_{oe}=Z_0\sqrt{1+c/1-c}$" should be --$Z_{oe}=Z_0\sqrt{\frac{1+c}{1-c}}$--.

Column 5, line 36, "$Z_{oo}=Z_0\sqrt{1-c/1+c}$" should be --$Z_{oo}=Z_0\sqrt{\frac{1-c}{1+c}}$--.

Column 7, line 33, "2" should be --13--.

Signed and sealed this 25th day of June 1974.

(SEAL)
Attest:

EDWARD M. FLETCHER, JR.
Attesting Officer

C. MARSHALL DANN
Commissioner of Patents